Jan. 8, 1963 D. R. COSTELLO 3,072,271
VEHICLE MOUNTED HOIST
Filed March 13, 1959 2 Sheets-Sheet 1
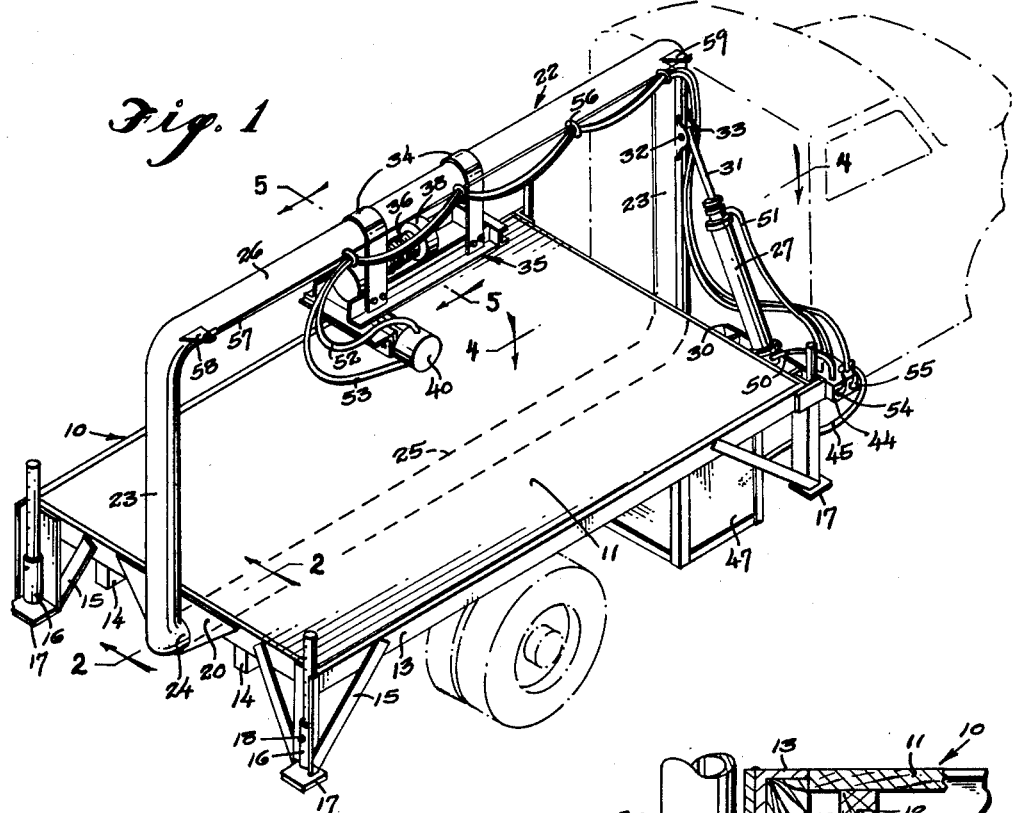
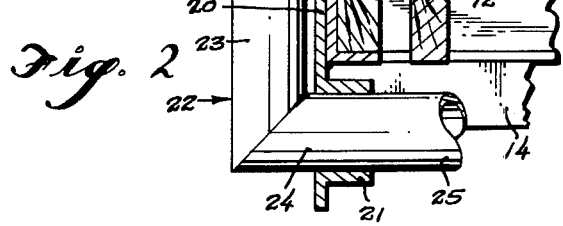
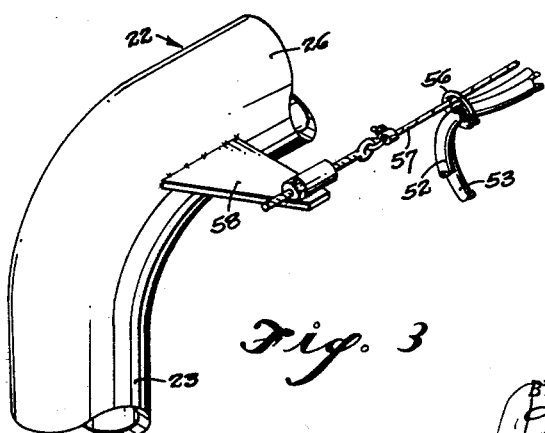
INVENTOR.
DANIEL R. COSTELLO
ATTORNEYS

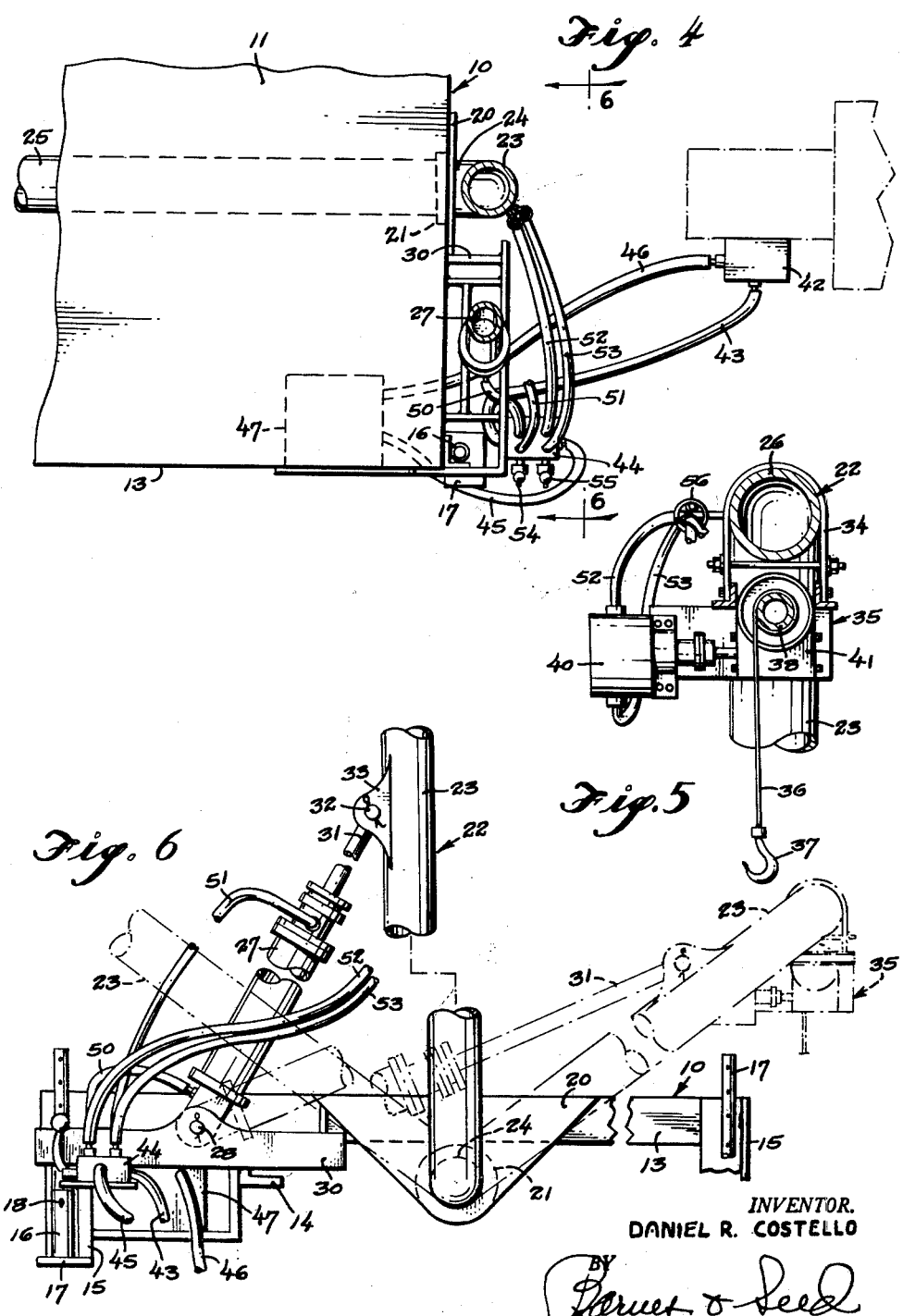

United States Patent Office 3,072,271
Patented Jan. 8, 1963

3,072,271
VEHICLE MOUNTED HOIST
Daniel R. Costello, 20028 15th NE., Seattle, Wash.
Filed Mar. 13, 1959, Ser. No. 799,245
4 Claims. (Cl. 214—77)

This invention relates to an improved truck-loading hoist of the type carried by the truck as a permanent adjunct thereof so as to enable a truck operator to load and unload his truck by power derived from the engine of the truck in the many instances where a powered fork-lift is not conveniently available. The present application is a continuation-in-part of my application for Letters Patent of the United States filed June 3, 1958, Ser. No. 739,539, now abandoned.

The invention has for its general object the provision of a device of the character described which is of comparatively simple and inexpensive construction, one which is strong and durable, and which performs its intended loading and unloading work with unusual ease and expedition. It is a further and particular object to devise a truck-carried loading structure which will handle loads lying alongside the truck and deposit the same upon the bed of the truck at any desired point within the length of the latter.

Still additional objects and advantages in view will, with the foregoing, appear and be understood in the course of the following description and claims, the invention consisting in the novel construction and in the adaptation and combination of parts hereinafter described and claimed.

In the accompanying drawings:

FIG. 1 is a perspective view portraying the bed of a truck equipped with a loading hoist constructed to embody the preferred teachings of the present invention.

FIG. 2 is a fragmentary longitudinal vertical sectional view drawn to an enlarged scale on line 2—2 of FIG. 1.

FIG. 3 is a fragmentary enlarged-scale perspective view detailing a harness arrangement for carrying hydraulic hoses leading to the hoist proper.

FIG. 4 is a fragmentary horizontal sectional view drawn to an enlarged scale on line 4—4 of FIG. 1.

FIG. 5 is a fragmentary transverse vertical sectional view drawn to an enlarged scale on line 5—5 of FIG. 1; and FIG. 6 is a fragmentary transverse vertical sectional view on line 6—6 of FIG. 4.

The loading device of the present invention is intended for use with truck or trailer bodies of the flat-bed type. Referring to the drawings said bed is designated by the numeral 10. In the form in which I have here elected to illustrate, the same said bed presents a plank deck 11 laid on cross-joists 12, the joists and planking being marginally contained by circumscribing channels 13 and deriving support from longitudinal frame principals 14 disposed at opposite sides of the longitudinal median line of the vehicle.

At each of the four corners of the bed a respective hanger 15 presents a short length of vertical pipe 16 giving slide support to a related one of four bearing feet 17, with each such bearing foot presenting a plurality of horizontal through-bores spaced at intervals of the height and adapted to be brought selectively into register with an opening in the pipe. These registering openings receive anchor pins 18 so as to releasably secure the feet 17 either in an elevated inoperative position or in a lowered position bearing upon the ground. In a manner believed to be apparent the function of these bearing feet is to stabilize the bed of the truck or trailer, as the case may be, when the hereinafter described loading device is being operated in the performance of its intended loading or unloading office.

At each of the two ends of the bed there is provided a bracket 20 presenting a journal box 21. These brackets are welded or otherwise rigidly secured to the end channels 13 in positions such that the two journal boxes hang therefrom, occupying a coinciding horizontal axis underlying said channels on the longitudinal median line of the bed. A substantial yoke fabricated from tubular pipe stock and designated generally by 22 receives a rotary journal from the journal boxes. To produce the journal mountings, moderately long side branches 23 of the yoke integrally connect by their root ends with inwardly directed trunnions 24, and such trunnions are connected directly by a cross-piece so that the yoke becomes, in effect, an integral part of a continuous loop having one cross-branch 25 close by underlying the bed while the other cross-branch 26 overlies the bed at a fairly considerable height thereabove. Both cross-branches are substantially rectilinear and lie parallel to one another. Cross-branch 26 serves the function of a bridge and will be hereinafter so termed.

The side branches 23 with their bridging piece 26 operate as a swing-frame movable in either lateral direction about the center of the trunnions as an axis from a normal centered position whereat the side branches 23 lie perpendicular to the bed into and from rather steeply inclined positions placing the bridge 26 in an outboard location as respects the side limits of the bed. To activate the swing-frame in its said swing movement a hydraulic cylinder-and-piston assembly has its cylinder 27 pivoted, as at 28, to a bracket 30 carried by the bed at one end thereof. The piston contained in said cylinder is double-acting and has its rod 31 pivoted, as at 32, to ears 33 fast to a side branch 23 of the swing-frame.

The tubular bridge has a winch hoist hung therefrom, with the hangers comprising a pair of invertedly applied U-straps 34 having their depending legs rigidly attached to a carriage 35. The loops of the straps loosely invest the bridge 36 so that the carriage is free to swing about the center of the bridge as an axis, and also admits to a sliding motion endwise to the axis of the bridge so as to be set at will at any selected point within the length of the bridge. The bearing surfaces of said straps are or may be greased at periodic intervals to facilitate the described motions.

A winch is journaled from the frame 35 for rotation about a horizontally disposed longitudinal axis. A cable or chain 36 carrying a hook 37 is wound on the winch drum 38, and a reversible hydraulic motor 40 connects with the winch through reduction gearing contained in a gear box 41.

To power the reversible hydraulic motor 40 and the double-acting piston contained in the cylinder 27, there is provided a pump 42 driven from the engine of the truck and having its eduction side connected by a hose 43 with a valve chest 44. Hoses 45 and 46 lead from the valve chest to an oil reservoir 47 and from the reservoir to the induction side of the oil pump 42, respectively. 50—51 and 52—53 denote pairs of hoses one of which connects respective ports of the valve chest with the two ends of the cylinder and the other of which connects respective chest ports with opposite sides of the reversing motor. Two valves are provided for the valve chest activated by a respective manually operated handle, as 54 and 55, so as to control the piston and the motor individually. As can be seen from an inspection of FIGS. 1 and 3 the hoses 52 and 53 are strung through rings 56 carried by a line 57 stretched moderately taut between two ears 58 and 59 welded to the bridge at opposite ends thereof. It is here pointed out, should the described loading equipment be applied to a trailer, that quick-release couplings are provided in the lines 46 and 43 enabling the same to be detachably connected to a pump permanently associated with a tractor truck.

In use the bridge is swung by the hydraulically activated piston in either lateral direction from the normal position shown by full lines in FIG. 6 into the outboard positions shown by broken lines. The winch hoist is a travelling unit in the sense that it may be moved at will endwise to the axis of the bridge and hence may pick up a load laying at any point alongside the bed of the truck and deposit the same in any desired position upon the truck bed. Rather than relying upon a greased slide-way the carriage 35 could, if desired, be suspended from the axles of monorail-type wheels tracking upon the bridge. It will be apparent that gravity so positions the winch hoist that the same hangs at all times perpendicular to the bridge.

It is thought that the invention will have been clearly understood from the foregoing detailed description of my now-preferred illustrated embodiment. Changes in details of construction will suggest themselves and may be resorted to without departing from the spirit of the invention, wherefore it is my invention that no limitations be implied and that the hereto annexed claims be given a scope fully commensurate with the broadest interpretation to which the employed language fairly admits.

What I claim, is:

1. In combination with a truck having a load-receiving bed and a power-driven hydraulic pump, means for loading said bed comprising a yoke-shaped swing-frame providing upright side arms connected at the top by a horizontal bridge and having the lower ends of said side arms journaled to the bed for swing motion about a horizontal axis located on the approximate longitudinal median line of such bed, a hydraulic double-acting piston-and-cylinder jack assembly pivoted at one end to the bed and at the other end to one of said side arms for swinging the swing-frame so as to move the bridge from a position disposed outboard relative to the bed in either lateral direction into a position overlying the bed, a winch hoist providing a winding drum, hanger means suspending said winch hoist from said bridge and including a carriage movable at will relative to the bridge in a direction endwise thereto, a reversible hydraulic motor having its driven end connected directly with the drum of the winch for driving the drum, an oil reservoir for the hydraulic pump, and means subjects to manual control for delivering oil under the pressure of the pump to either end of the jack cylinder or to either end of the hydraulic motor, selectively, while simultaneously bringing the opposite end of the concerned hydraulic unit into communication with the reservoir, the front side arm of said swing-frame lying beyond the front end limit of the bed and the rear side arm of said swing-frame lying beyond the rear end limit of the bed so that loads picked up by the winch hoist may be freely swung by said swing-frame to and from the bed at any point between the extreme fore-and-aft end limits of the bed.

2. Structure as recited in claim 1 in which the hanger means admits to a free swivelling relative to the bridge so that the winch hoist will at all times center itself by force of gravity directly below the bridge.

3. In combination with the load-receiving bed of a wheeled vehicle, a unitary swing-frame formed to a yoke shape so as to provide upright side arms connected across the top by a bridge having a length approximately the same as that of the bed and at the lower ends of said side arms presenting inturned co-axial trunnions received for rocker motion in rotary journals provided by the bed on the approximate longitudinal median line thereof, one at the front and the other at the rear of the bed, for swing movement of the bridge about the center of said trunnions as an axis from a normal position overlying the axis into a position lying outboard of the bed at either side thereof, selectively, a winch hoist carried by said bridge of the swing-frame, and power operated means for moving said swing-frame in its said swing movement, means being provided permitting said winch hoist to be shifted at will to any selected point within the end limits of the bridge, the front side arm of said swing-frame lying beyond the front end limit of the bed and the rear side arm of said swing-frame lying beyond the rear end limit of the bed so that loads picked up by the winch hoist may be freely swung by said swing-frame to and from the bed at any point between the extreme fore-and-aft end limits of the bed.

4. Structure according to claim 5 in which the rotary journals lie below the bed and wherein a cross-piece rigidly connects said trunnions below the bed and serves with the side arms and bridge of the swing-frame to provide a continuous integral loop.

References Cited in the file of this patent

UNITED STATES PATENTS

| | | |
|---|---|---|
| 145,234 | Pennock | Dec. 2, 1873 |
| 2,525,735 | Symons | Oct. 10, 1950 |
| 2,740,538 | Felkner | Apr. 3, 1956 |
| 2,771,197 | Leffler | Nov. 20, 1956 |
| 2,828,036 | White | Mar. 25, 1958 |
| 2,911,118 | Toff | Nov. 3, 1959 |
| 2,927,704 | Condon | Mar. 8, 1960 |

FOREIGN PATENTS

| | | |
|---|---|---|
| 612,950 | Germany | May 8, 1935 |